(12) United States Patent
Kaida

(10) Patent No.: US 9,973,693 B2
(45) Date of Patent: May 15, 2018

(54) IMAGE PROCESSING APPARATUS FOR GENERATING WIDE-ANGLE IMAGE BY COMPOSITING PLURAL IMAGES, IMAGE PROCESSING METHOD, STORAGE MEDIUM STORING IMAGE PROCESSING PROGRAM, AND IMAGE PICKUP APPARATUS

(71) Applicant: CANON KABUSHIKI KAISHA, Tokyo (JP)

(72) Inventor: Hironori Kaida, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 391 days.

(21) Appl. No.: 14/820,193

(22) Filed: Aug. 6, 2015

(65) Prior Publication Data
US 2016/0044241 A1    Feb. 11, 2016

(30) Foreign Application Priority Data
Aug. 11, 2014   (JP) .................................. 2014-163613

(51) Int. Cl.
*H04N 9/47*    (2006.01)
*H04N 7/18*    (2006.01)
(Continued)

(52) U.S. Cl.
CPC ....... *H04N 5/23238* (2013.01); *G06T 3/4038* (2013.01); *G06T 5/50* (2013.01);
(Continued)

(58) Field of Classification Search
None
See application file for complete search history.

(56) References Cited

U.S. PATENT DOCUMENTS

2002/0167604 A1* 11/2002 Ban .................. H04N 5/235
348/364
2003/0227545 A1* 12/2003 Soya ................ H04N 5/23203
348/143
(Continued)

FOREIGN PATENT DOCUMENTS

JP      11-065004 A    3/1999
JP      2013-058931 A  3/2013

*Primary Examiner* — Talha M Nawaz
(74) *Attorney, Agent, or Firm* — Cowan, Liebowitz & Latman, P.C.

(57) ABSTRACT

An image processing apparatus that is capable of generating a wide-angle composite image in which halation and black collapse are reduced without needing lots of memory quantity. An obtaining unit obtains images that are photographed with different exposure values while changing a photographing target area continuously. A detection unit detects an overlapped area where an object overlaps between adjacent images among the images obtained by the obtaining unit. A generation unit generates a composite area in which overlapped areas detected by the detection unit are overlapped so as not to exceed a predetermined count. A computation unit computes composition ratios of the images obtained by the obtaining unit based on the exposure values and signal values at the times when the images are photographed. A composition unit generates a wide-angle composite image by compositing images in the composite area with the composition ratios computed.

13 Claims, 10 Drawing Sheets

(51) Int. Cl.
  *H04N 5/232*  (2006.01)
  *G06T 5/50*   (2006.01)
  *G06T 3/40*   (2006.01)
  *H04N 5/235*  (2006.01)
  *H04N 5/262*  (2006.01)
  *H04N 5/357*  (2011.01)
(52) U.S. Cl.
  CPC ......... *H04N 5/2353* (2013.01); *H04N 5/2624* (2013.01); *H04N 5/3572* (2013.01); *G06T 2207/20221* (2013.01)

(56) References Cited

U.S. PATENT DOCUMENTS

| | | | | |
|---|---|---|---|---|
| 2005/0140819 | A1* | 6/2005 | Kawamura | H04N 5/2353 348/362 |
| 2005/0258370 | A1* | 11/2005 | Kawamura | B60R 1/00 250/370.08 |
| 2011/0228043 | A1* | 9/2011 | Masuda | H04N 13/0221 348/36 |
| 2011/0228123 | A1* | 9/2011 | Matsumoto | H04N 5/23238 348/222.1 |
| 2012/0257085 | A1* | 10/2012 | Matsumoto | H04N 1/3876 348/239 |

* cited by examiner

ANGULAR COORDINATE $(\alpha, \beta, \gamma)$
POSITIONAL COORDINATE $(X, Y, Z)$

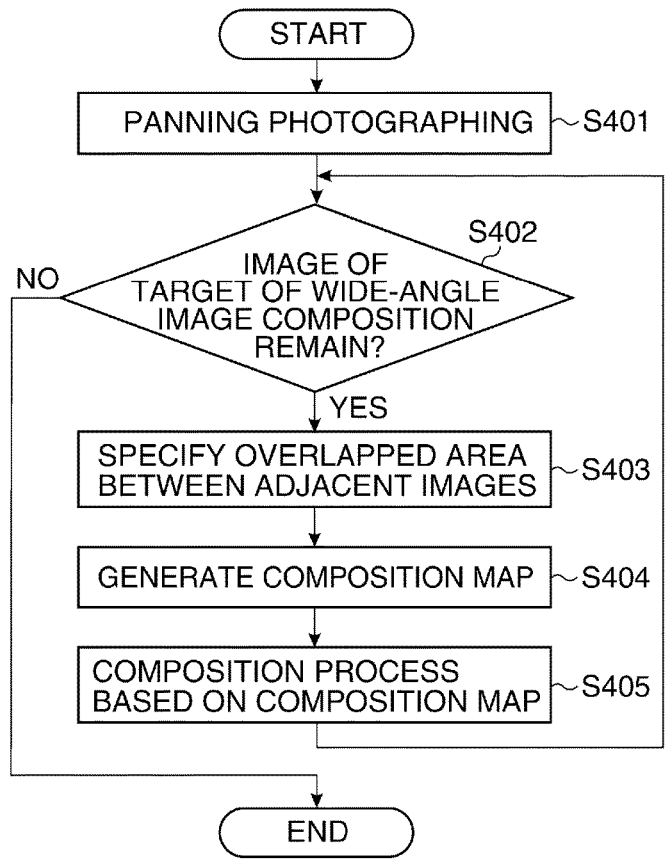
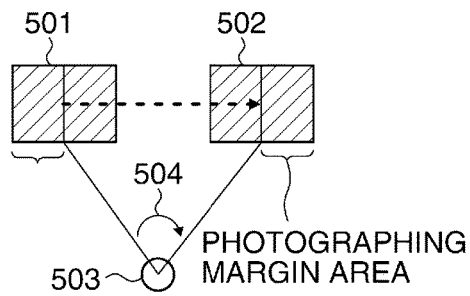
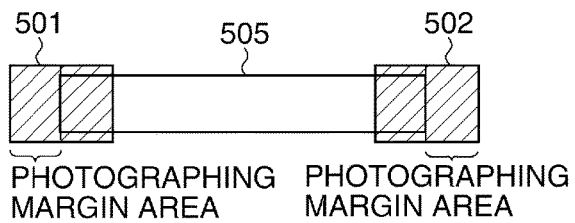

THIRD COMPOSITION COUNT MAP

IMAGE PROCESSING APPARATUS FOR GENERATING WIDE-ANGLE IMAGE BY COMPOSITING PLURAL IMAGES, IMAGE PROCESSING METHOD, STORAGE MEDIUM STORING IMAGE PROCESSING PROGRAM, AND IMAGE PICKUP APPARATUS

BACKGROUND OF THE INVENTION

Field of the Invention

The present invention relates to an image processing apparatus for generating a wide-angle image by compositing a plurality of images, an image processing method, a storage medium storing an image processing program, and an image pickup apparatus, and in particular, relates to a technique for generating a wide-angle image with satisfactory image quality by reducing halation and black collapse.

Description of the Related Art

In recent years, solid state image pickup devices, such as a CCD sensor and a CMOS sensor, are widely used as image pickup devices in image pickup apparatuses, such as a video camera (television camera) and a still camera. A method for taking a plurality of images for the same scene and compositing these images by calculation is proposed for purposes of expanding a dynamic range of a solid state image pickup device, reducing a noise, controlling camera shake at the time of hand-held photographing, and enlarging an angle of view.

For example, a method for generating a wide-angle image by photographing continuously while shifting a photographing area, matching (alignment) a plurality of obtained images, and compositing the images so that objects are connected is proposed (see Japanese Laid-Open Patent Publication (Kokai) No. 2013-58931 (JP 2013-58931A)). Moreover, a method for obtaining an image of which a dynamic range is expanded by compositing images photographed at different exposures is proposed (see Japanese Laid-Open Patent Publication (Kokai) No. H11-65004 (JP H11-65004A)).

Hereinafter, a method for compositing a plurality of images so as to expand an angle of view is referred to as "wide-angle image composition", and an image obtained by the wide-angle image composition is referred to as a "wide-angle composite image".

The technique disclosed in JP 2013-58931A generates a wide-angle composite image by specifying alignment coordinates of photographed images and connecting images at the specified coordinate positions. Accordingly, although a wide-angle composite image that covers an extremely wide angle of view can be generated, a dynamic range of an object is extended and halation and black collapse may be included in the image.

On the other hand, the technique disclosed in JP H11-65004A generates a wide-angle composite image by connecting images photographed at the same exposure value, and then, composites wide-angle composite images of which the exposure values differ. In this case, lots of memory is needed for storing intermediate images, such as the wide-angle composite image generated using images photographed at the same exposure value, generated during the compositing process for generating a wide-angle composite image. As a result, an inexpensive image processing apparatus without lots of memory may slow image-composition velocity or cannot execute image composition.

SUMMARY OF THE INVENTION

The present invention provides a technique that is capable of generating a wide-angle composite image in which halation and black collapse are reduced without needing lots of memory quantity for storing images temporarily during image composition.

Accordingly, a first aspect of the present invention provides an image processing apparatus including an obtaining unit configured to obtain a plurality of images that are photographed with different exposure values including a proper exposure value while changing a photographing target area continuously, a detection unit configured to detect an overlapped area where an object overlaps between adjacent images among the plurality of images obtained by the obtaining unit, a generation unit configured to generate a composite area in which overlapped areas detected by the detection unit are overlapped so as not to exceed a predetermined count, a computation unit configured to compute composition ratios of the plurality of images obtained by the obtaining unit based on the exposure values and signal values at the times when the plurality of images are photographed, and a composition unit configured to generate a wide-angle composite image by compositing images in the composite area generated by the generation unit with the composition ratios computed by the computation unit.

Accordingly, a second aspect of the present invention provides an image processing apparatus including an obtaining unit configured to obtain a plurality of images that are photographed with different exposure values including a proper exposure value while changing a photographing target area continuously, an overlapping unit configured to overlap the plurality of images obtained by the obtaining unit so that a photographed object overlaps between adjacent images and so that the plurality of images photographed with the different exposure values are overlapped one by one, and a composition unit configured to generate a wide-angle composite image by compositing images in an area where the plurality of images photographed with the different exposure values are overlapped one by one by the overlapping unit.

Accordingly, a third aspect of the present invention provides an image processing method including an obtaining step of obtaining a plurality of images that are photographed with different exposure values including a proper exposure value while changing a photographing target area continuously, a detecting step of detecting an overlapped area where an object overlaps between adjacent images among the plurality of images obtained in the obtaining step, a generation step of generating a composite area in which overlapped areas detected in the detecting step are overlapped so as not to exceed a predetermined count, a computation step of computing composition ratios of the plurality of images obtained in the obtaining step based on the exposure values and signal values at the times when the plurality of images are photographed, and a generation step of generating a wide-angle composite image by compositing images in the composite area generated in the generation step with the composition ratios computed in the computation step.

Accordingly, a fourth aspect of the present invention provides a non-transitory computer-readable storage medium storing a control program causing a computer to execute the image processing method of the third aspect.

Accordingly, a fifth aspect of the present invention provides an image pickup apparatus including an image pickup unit configured to perform panning photographing while repeating to photograph images with different exposure values, a detection unit configured to detect an overlapped area where an object overlaps between adjacent images among the plurality of images obtained by the panning photographing of the image pickup unit, and a composition unit configured to composite the plurality of images in order about the overlapped area, to generate a wide-angle composite image using a composite image of which a composition count reaches a predetermined count, and to be able to expand field angle of the wide-angle composite image by adding a composite image of which a composition count does not reach the predetermined count to the generated wide-angle composite image.

The present invention enables to generate a wide-angle composite image in which halation and black collapse are reduced without needing lots of memory quantity for storing intermediate images at the time of generating a wide-angle composite image.

Further features of the present invention will become apparent from the following description of exemplary embodiments with reference to the attached drawings.

BRIEF DESCRIPTION OF THE DRAWINGS

FIG. 4 is a flowchart showing processing procedures in a case of generating a wide-angle composite image with the digital still camera in FIG. 1.

FIG. 5A and FIG. 5B are views schematically showing a method of panning photographing in step S401 in FIG. 4.

DESCRIPTION OF THE EMBODIMENTS

Hereafter, embodiments according to the present invention will be described in detail with reference to the drawings. Here, a digital camera is photograph up as an image processing apparatus according to the present invention. However, the image processing apparatus concerning the present invention is not limited to a digital camera. It is sufficient if an apparatus can process a photographed image obtained by a camera (image pickup means). For example, a personal computer (PC) etc. may be the image processing apparatus. That is, the image pickup means and image processing means may be united into one like a digital camera, or may be separated like a combination of an image pickup means and a personal computer.

When the image pickup means and image processing means are united into one, the image processing apparatus concerning the present invention is not limited to apparatuses specialized for photographing, such as a digital camera and a digital video camera. For example, a portable communication terminal, a personal computer, a game machine, etc. that have a camera function may be employed as the apparatus of the present invention. Moreover, when the image pickup means and image processing means are separated, the image pickup means transmits a photographed image to the image processing means with wireless communication or wired communication through a network or a direct connection.

Figure 1:
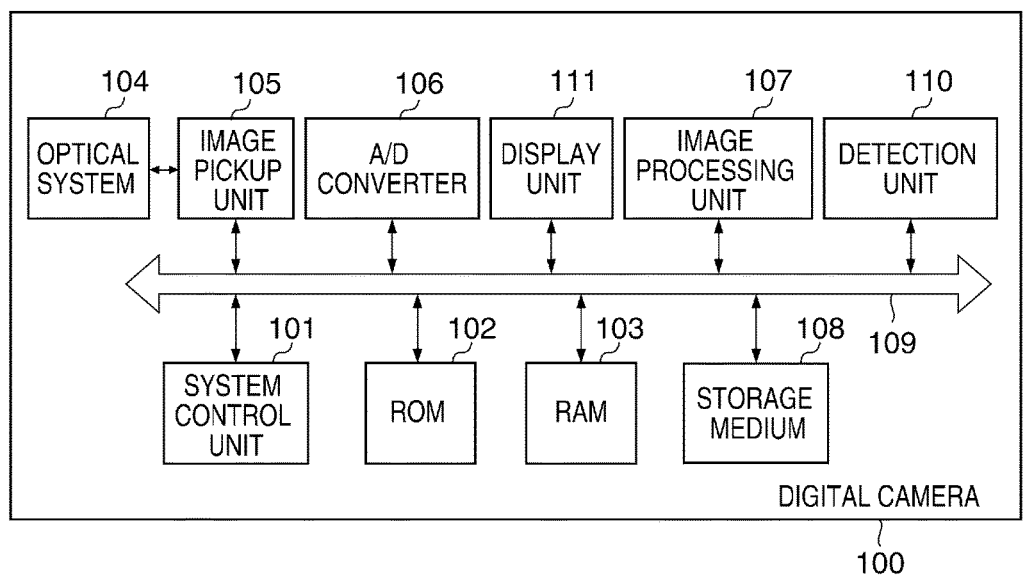
FIG. 1 is a block diagram schematically showing a configuration of a digital camera according to an embodiment of the present invention.

FIG. 1 is a block diagram schematically showing a configuration of the digital camera 100 according to an embodiment of the present invention. The digital camera 100 is provided with a system control unit 101 (hereinafter referred to as a "control unit 101"), a ROM 102, a RAM 103, an optical system 104, an image pickup unit 105, an A/D convertor 106, an image processing unit 107, a storage medium 108, a detection unit 110, and a display unit 111. These blocks communicate through a bus 109.

The control unit 101 is a CPU, for example, and totally controls an operation of each block constituting the digital camera 100 by reading an operation program for each block from the ROM 102, and developing it to the RAM 103. The ROM 102 is a rewritable nonvolatile memory, and stores an operation program for each block constituting the digital camera 100, a parameter required for an operation of each block, etc. The RAM 103 is a rewritable volatile memory, and is used as a working area of the CPU and as a temporary storage area of data output by an operation of each block constituting the digital camera 100.

The optical system 104 takes in light from an object, and forms an optical image (an object image) on an image pickup device, such as a CCD sensor or a CMOS sensor, of the image pickup unit 105. The optical system 104 includes a diaphragm that adjusts light amount by changing an aperture diameter of the optical system 104. The image pickup device with which the image pickup unit 105 is provided converts an optical image photoelectrically, and outputs an analog electric signal to the A/D convertor 106. The A/D convertor 106 A/D-converts the analog electric signal supplied from the image pickup unit 105, outputs the image data which is a generated digital signal to the RAM 103, and stores.

The image processing unit 107 applies image processes, such as a white balance process, a gamma correction process, to the image data stored in the RAM 103. The storage medium 108 is a detachable memory card, for example, and stores the image data that is processed by the image processing unit 107 and is stored in the RAM 103, the digital signal (image signal) that is converted by the A/D convertor 106, etc., for example.

The detection unit 110 consists of a well-known gyro sensor, an acceleration sensor, etc. Output signals from the detection unit 110 are transmitted to the control unit 101. The control unit 101 detects a posture and motions (an angle, acceleration, a moving amount, etc.) of the digital camera 100 on the basis of the output signals obtained from the detection unit 110.

Figure 2:
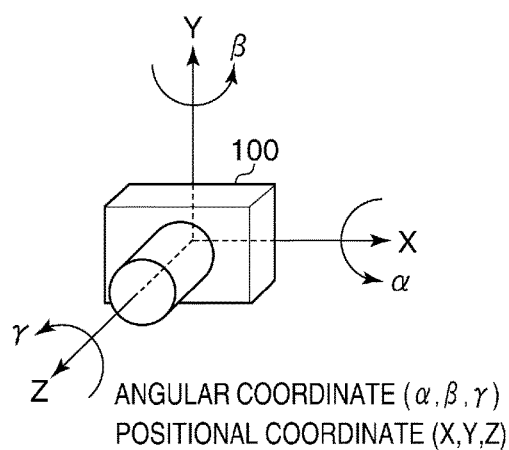
FIG. 2 is a perspective view showing a coordinate system set to the digital camera in FIG. 1.

FIG. 2 is a perspective view showing a coordinate system set to the digital camera 100 in this embodiment. The optical axis direction of the optical system 104 in the digital camera 100 is defined as a Z-axis direction. An X-axis and a Y-axis are defined in a body unit of the digital camera 100 so that the X-axis is perpendicular to the Z-axis and the Y-axis. The control unit 101 calculates reference values of an angular coordinate ($\alpha$, $\beta$, $\gamma$) and a positional coordinate (X, Y, Z) of the digital camera 100 on the basis of the output signals obtained from the detection unit 110, and calculates relative values (differences) with respect to the reference values after movement. For example, the control unit 101 appoints the angular coordinate and positional coordinate at the time of taking a first frame of a panning photographing as reference values (an angular coordinate (0, 0, 0) and a positional coordinate (0, 0, 0)). The control unit 101 calculates the relative angle variation and position change (moving amount) from the reference values by integrating an angular velocity and acceleration detected by the detection unit 110.

The display unit 111 includes a display like an LCD (liquid crystal display) that displays an image and a variety of information, and a display control circuit that controls displaying of the display. Display image data stored in the RAM 103 is converted into an analog signal by a D/A convertor in the display control circuit, and is displayed on the display.

Figure 3:
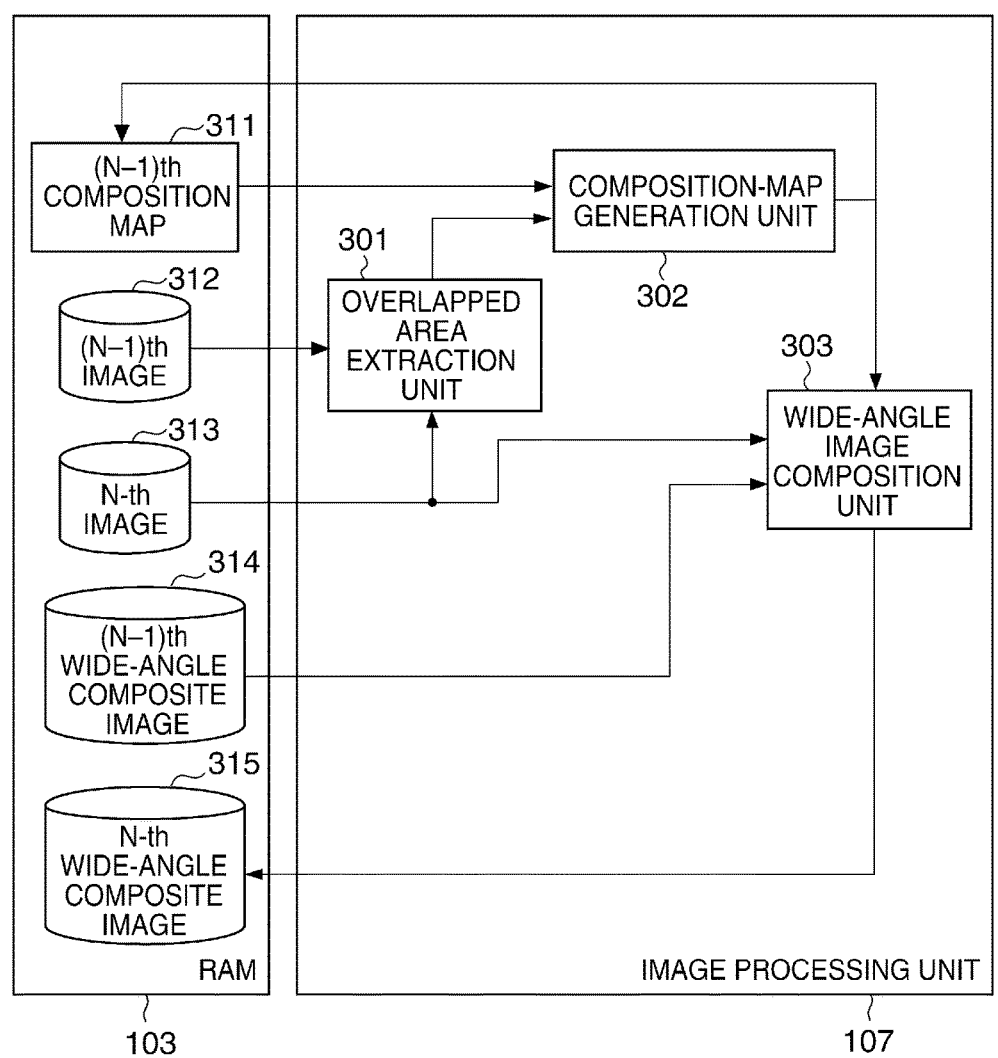
FIG. 3 is a block diagram schematically showing a configuration of an image processing unit of the digital camera in FIG. 1.

FIG. 3 is a block diagram schematically showing a configuration of the image processing unit 107. The image processing unit 107 has an overlapped area extraction unit 301, a composition-map generation unit 302, and a wide-angle image composition unit 303. Functions of these units will be collectively described in a description for a flowchart in FIG. 4.

FIG. 4 is a flowchart showing processing procedures in a case of generating a wide-angle composite image with the digital still camera 100. This embodiment describes a process for generating a wide-angle composite image that has been improved in reduction of halation and black collapse.

The process shown in the flowchart in FIG. 4 is started when panning photographing is instructed to the control unit 101 by depression of a release button of an operation unit (not shown) in the digital camera 100. In this case, a photographer performs panning photographing by pivoting the digital camera 100 in a horizontal direction from the left side to the right side viewed from the photographer (around the Y-axis in FIG. 2). That is, the photographer continuously photographs images while changing a photographing target area. The image processing unit 107 composites the obtained photographed image, and generates a wide angle image. It should be noted that the panning photographing may be performed in another direction, such as the opposite horizontal direction (from the right to the left) or a vertical direction (from the bottom to the top or from the top to the bottom).

The process shown in the flowchart in FIG. 4 is achieved because the control unit 101 develops a program read from the ROM 102 to the RAM 103 and controls an operation of each unit constituting the digital camera 100.

In step S401, the control unit 101 performs a panning photographing with three different exposure values. For example, evaluated photometry is performed by an AE control of the digital camera 100 to determine a proper exposure value, and a low exposure value that is lower than the proper exposure value by a predetermined step and a high exposure value that is higher than the proper exposure value by a predetermined step are determined. Then, the control unit 101 indicates the photographing direction to the photographer. And accordingly, the photographer photographs images while panning the digital camera 100 in the direction indicated by the control unit 101. At this time, the images are photographed in order of a proper exposure value, a low exposure value, a high exposure value, a proper exposure value, a low exposure value, and . . . . It should be noted that the panning photographing in the step S401 will be mentioned later with reference to FIG. 5 and FIG. 6.

At this time, the control unit 101 detects the posture and the motion of the digital camera 100 on the basis of the output signal from the detection unit 110, and determines whether the panning photographing expected is performed with the digital camera 100.

In step S402, the control unit 101 determines whether any image remains without being processed in steps S403 through S405 (a wide-angle image composition) among the photographed images obtained by the panning photographing in the step S401. When an unprocessed photographed image does not remain (NO in the step S402), the control unit 101 finishes this process. When an unprocessed photographed image remains (YES in the step S402), the control unit 101 proceeds with the process to the step S403.

In the step S403, the control unit 101 controls the overlapped area extraction unit 301 so as to specify an area in which objects are overlapped between an (N−1)th image 312 (see FIG. 3) and an adjacent N-th image 313 among the photographed images obtained by the panning photographing in the step S401 as an (N−1)th overlapped area. In this specification, "N" is an integer equal to or larger than 2. It should be noted that the processes in the steps S403 through S405 are not performed directly using the photographed images obtained by the panning photographing in the step S401, but are actually performed using correction images that are generated by correcting signal levels of the photographed images. The details will be described later with reference to FIG. 6 and FIG. 7.

In the step S404, the control module 101 controls the composition-map generation unit 302 to make an N-th composition map on the basis of an (N−1)th composition map 311 that is a result of (N−1) times of the wide-angle image compositions, the N-th overlapped area ((N+1)th correction image) that is output from the overlapped area extraction unit 301, and composition ratio tables that are defined beforehand for every exposure value of a photographed image. It should be noted that the first composition map is made on the basis of an overlapped area (first overlapped area) between the first and second photographed images. The details of the making method of the N-th composition map will be described later with reference to FIG. 8 or FIG. 10.

In the step S405, the control unit 101 controls the wide-angle image composition unit 303 to generates an N-th wide-angle composite image 315 on the basis of a wide-angle composite image 314 that is a result of (N−1) times of the wide-angle image compositions, an N-th overlapped area ((N+1)th correction image), and the N-th composition map made by the composition-map generation unit 302. It should be noted that the first wide-angle composite image is made on the basis of the overlapped area (first overlapped area) between the first and second photographed images.

After finishing the step S405, the control unit 101 returns the process to the step S402. The control unit 101 generates a final wide-angle composite image by repeating the processes in the steps S402 through S405 to all the photographed images (correction images) obtained by the panning photographing.

FIG. 5A and FIG. 5B are views schematically showing the panning photographing in the step S401. As shown in FIG. 5A, the photographer directs the digital camera 100 in a predetermined direction, starts photographing, and photographs a photographing start image 501. The photographer repeats photographing at predetermined intervals while pivoting the digital camera 100 around a pivotal center 503 (the Y-axis in FIG. 2) of the digital camera 100 in a pivotal direction 504 (a clockwise direction in FIG. 5A). The panning photographing will be finished when a photographing end image 502 is photographed.

As shown in FIG. 5B, the photographing start image 501 and the photographing end image 502 have photographing margin areas that are not targets of composition, respectively. These photographing margin areas are not included in the field angle of the wide-angle composite image finally output. Accordingly, the wide-angle composite image finally output covers an area from the photographing start image 501 except the photographing margin area to the photographing end image 502 except the photographing margin area.

Figure 6A:
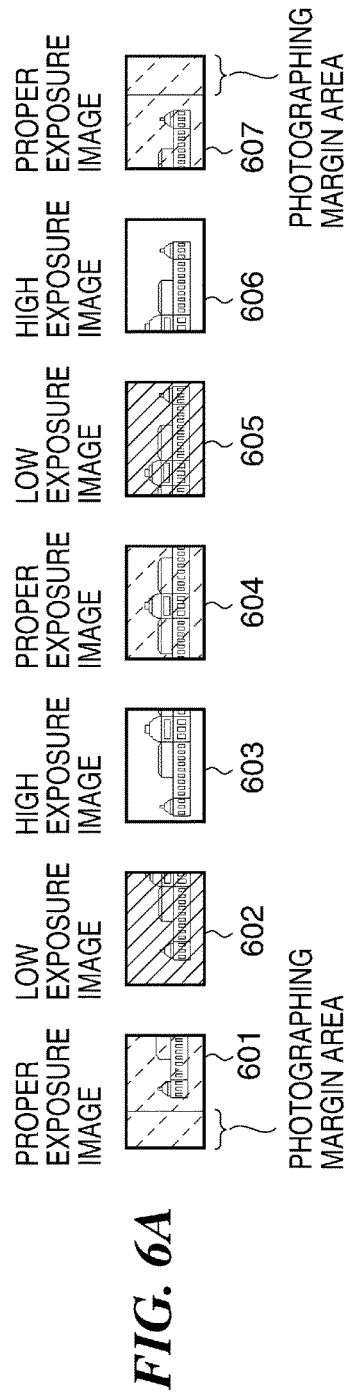
FIG. 6A is a view showing examples of actual photographed images obtained by the panning photographing in the step S401 in FIG. 4.

FIG. 6A is a view showing examples of actual photographed images obtained by the panning photographing in the step S401. In this case, the photographer starts photographing while setting the photographing margin area at the left side of a structure as an object so that the left side of the structure is photographed with a space, and finishes photographing while setting the photographing margin area at the right side of the structure so that the right side of the structure is photographed with a space.

In this embodiment, as shown in FIG. 6A, seven photographed images shall be photographed actually. The proper exposure images 601, 604, and 607 are images photographed at the proper exposure value. The low exposure images 602 and 605 are images photographed at the low exposure value. The high exposure images 603 and 606 are images photographed at the high exposure value. It should be noted that the proper exposure image 601, 604, 607, the low exposure image 602, 605, and the high exposure image 603, 606 may be referred to as photographed images 601 through 607 suitably in the following description.

The photographed images photographed at the different exposure values differ in the signal level (output signal level from the image pickup device) due to the exposure difference. Since it is necessary to equalize the signal levels when compositing images, the correction process for equalizing the signal levels of the same object areas is applied to the actual photographed images 601 through 607 obtained by the panning photographing. The correction method is not particularly limited. A method for equalizing brightness levels by multiplying the gains proportional to the exposure values to the signal values (luminance values) of the photographed images 601 through 607, a method for correcting brightness levels of the photographed images by a gamma process, etc. can be employed.

Figure 6B:
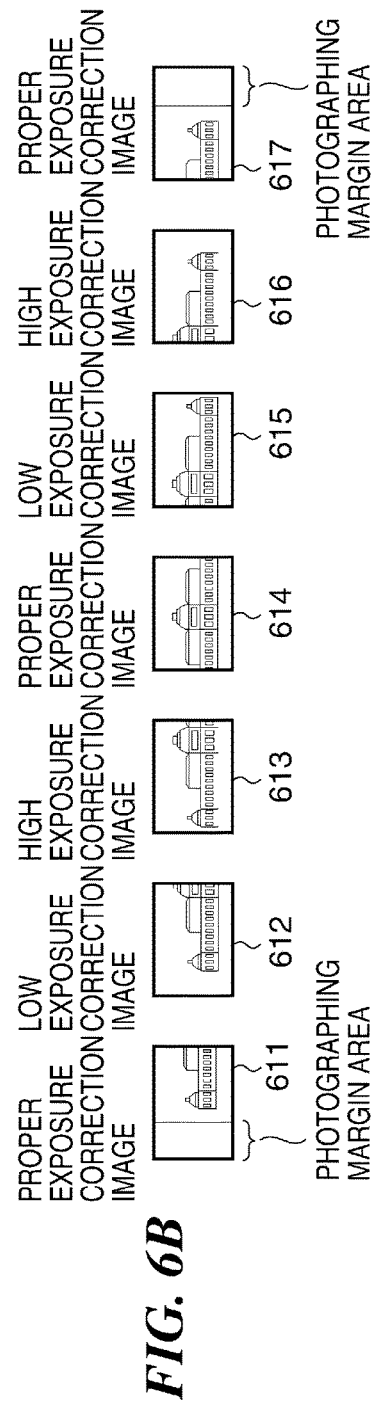
FIG. 6B is a view schematically showing examples of correction images obtained by correcting the actual photographed images shown in FIG. 6A.
Figure 6C:
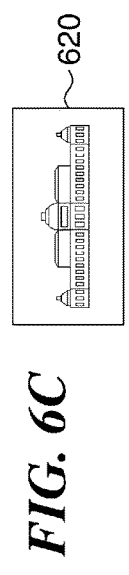
FIG. 6C is a view showing an example of a wide-angle composite image finally generated from the correction images shown in FIG. 6B.

FIG. 6B is a view schematically showing correction images 611 through 617 that are obtained by performing correction for equalizing the brightness levels of the actual photographed images 601 through 607 shown in FIG. 6A. Moreover, FIG. 6C is a view showing an example of a wide-angle composite image 620 finally generated from the correction images 611 through 617 shown in FIG. 6B.

The specifying process of an overlapped area between adjacent photographed images in the step S403 will be described with reference to FIG. 7.

Figure 7:
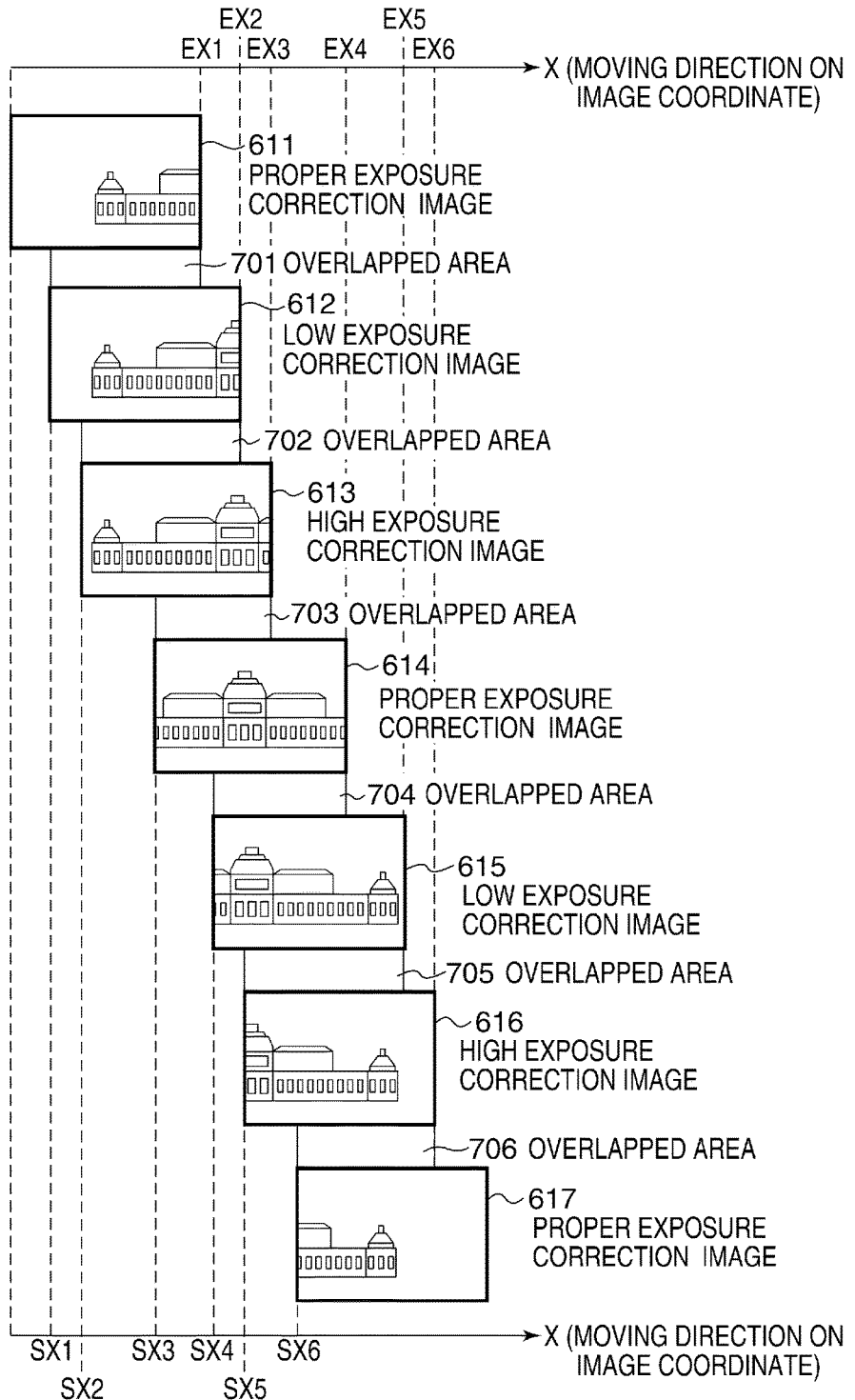
FIG. 7 is a view showing a specifying method of an overlapped area executed in the step S403 in FIG. 4 using the correction images shown in FIG. 6B.

FIG. 7 is a view explaining a method for specifying overlapped areas between adjacent photographed images about the photographed images 601 through 607 using the correction images 611 through 617 shown in FIG. 6B. In the specifying process of an overlapped area between adjacent photographed images, areas in which objects are overlapped in adjacent correction images are computed about the correction images 611 through 617. Accordingly, in FIG. 7, the moving amounts of the correction images 612 through 617 are taken along a horizontal axis on the basis of the correction image 611, and the correction images 612 through 617 are aligned to the previous correction image so that the same portions of the objects overlap.

A general image alignment method can be used as the alignment method of adjacent correction images. For example, the method of dividing correction images into small blocks of an optional size, computing corresponding points at which SAD (Sum of Absolute Difference) of image signals (luminance etc.) becomes minimum for every small block, and computing a motion vector, etc. can be used.

In the alignment process for the correction images 611 and 612, a first overlapped area 701 of which a start coordinate is set to SX1 and an end coordinate becomes EX1 is determined. Similarly, in the alignment process for the correction images 612 and 613, a second overlapped area 702 in which a start coordinate is set to SX2 and an end coordinate becomes EX2 is determined. Thus, the first overlapped areas 701 through sixth overlapped area 706 are determined by computing feature quantity like moving amounts (coordinates) by the alignment process for a pair of adjacent correction images in order about the correction images 611 through 617. It should be noted that a geometrical conversion process is performed so that the following correction image is aligned to the position of the previous correction value about the adjacent correction images to which the alignment process has been applied in the step S403, simultaneously with the specifying process of the first overlapped area 701 through sixth overlapped area 706.

Figure 8:
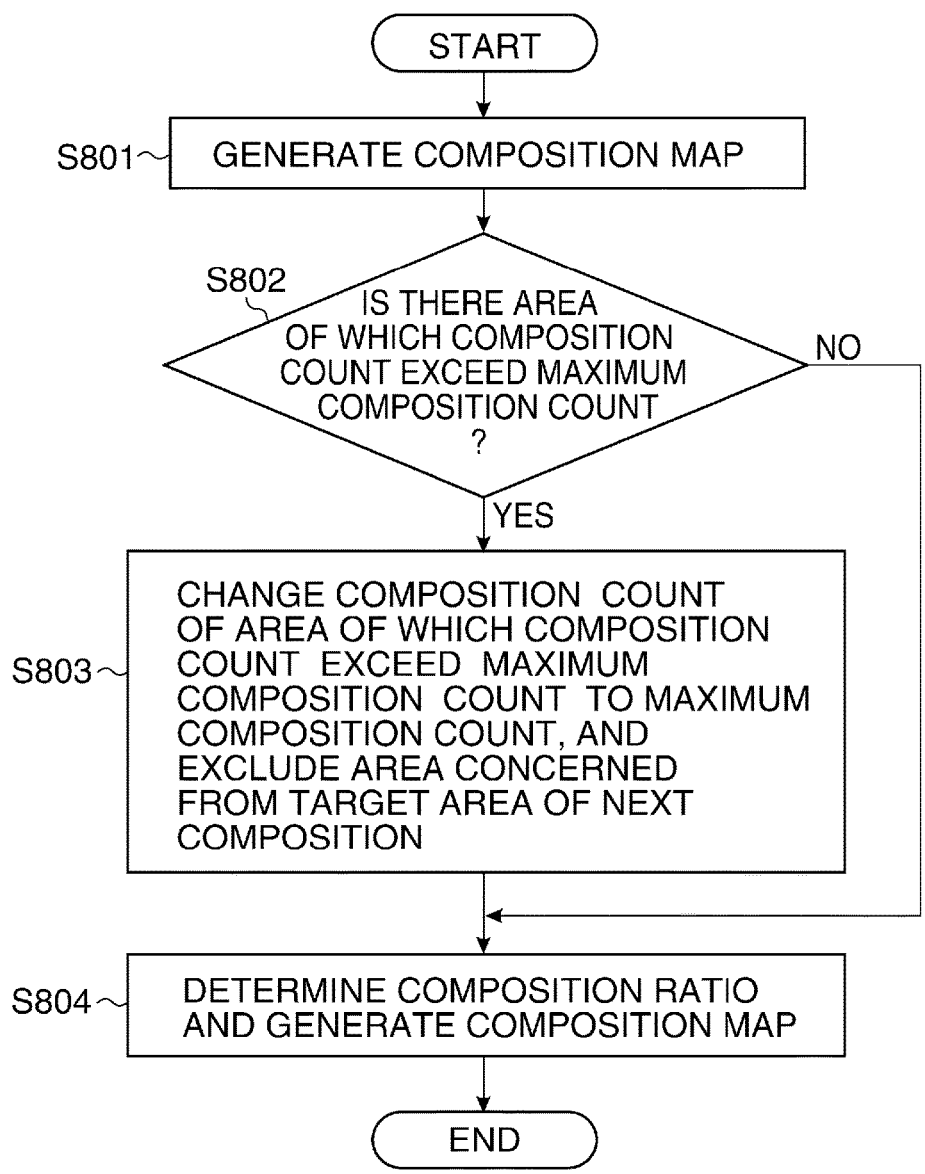
FIG. 8 is a flowchart showing details of a composition-map generation process executed in the step S404 in FIG. 4.

Next, the composition-map generation process in the step S404 will be described with reference to FIG. 8 through FIG. 10. FIG. 8 is a flowchart showing details of the composition-map generation process executed in the step S404.

In step S801, the composition-map generation unit 302 generates a composition count map. FIG. 9A through FIG. 9D are views schematically showing composition-count-map generation procedures. A composition count map shows how many times a certain area was composited in each procedure for compositing a plurality of photographed images in order. The composition count map is generated using the overlapped areas 701 through 706 shown in FIG. 7. It should be noted that FIG. 9A through FIG. 9D show the first, second, third, and sixth composition count maps 901, 902, 903, and 906, and do not show the fourth and fifth composition count maps.

When a composition count map is generated, the areas in which the overlapped areas 701 through 706 overlap are counted, and the count of overlaps serves as a value of the composition count. For example, since there is no previous composition count map at the time of generating the first composition count map 901, the first composition count map 901 is generated on the basis of the overlapped area 701 of the correction images 611 and 622. In the first composition count map 901 shown in FIG. 9A, the value of the composition count is set to "1" in the area from SX1 to EX1, and the value of the composition count is set to "zero (0)" in the areas other than the area from SX1 to EX1.

When there is an area in the composition count map generated previously that overlaps with the overlapped area that is overlapped at this time, the value of the composition count of the area is incremented. For example, in the second composition count map 902 shown in FIG. 9B, there are two areas that are the overlapped area 701 in the first composition count map and the overlapped area 702 composited this time. Accordingly, in the second composition count map 902, the value of the composition count in the area from SX1 to SX2 is set to "1", the value of the composition count in the area from SX2 to EX1 is set to "2", the value of the composition count in the area from EX1 to EX2 is set to "1", and the value of the composition count in the other area is set to "0".

In step S802, the composition-map generation unit 302 determines whether there is an area of which the composition count exceeds a predetermined maximum composition count in the composition count map. Since it is necessary to composite a low exposure image, a proper exposure image, and a high exposure image in the same area in this embodiment, two times of compositions are needed in the same area. Then, the maximum composition count is set to "2", and an area of which the composition count becomes "2" serves as a composite area. Accordingly, when there is an area of which the composition count exceeds "2" in the composition count map (YES in the step S802), the control unit 101 proceeds with the process to step S803. When there is no area of which the composition count exceeds "2" (NO in the step S802), the control unit 101 proceeds with the process to step S804.

In the step 803, the composition-map generation unit 302 changes the composition count of an area of which the composition count exceeds "2" into the maximum composition count "2", and excludes the area from a target area of the next composition. For example, there are three overlapped areas 701 through 703 in the third composition count map 903 shown in FIG. 9C, and three overlapped areas 701 through 703 overlap in the area from SX3 to EX1. Accordingly, in the third composition count map 903, although the composition count of the area from SX3 to EX1 should be computed as "3", it is changed to the maximum composition count "2", and the area from SX3 to EX1 is excluded from a composition target area. Accordingly, the composition count map in which the composition count of the area from SX2 to EX2 is set to "2" as the maximum composition count is generated.

In the step S804, the composition-map generation unit 302 computes a composition ratio used when compositing an area (composite area) of which composition count does not exceed the maximum composition count in the composition count map obtained by the process up to the step S803, and generates a composition map. When generating the composition map, different composition ratios are respectively used for the low exposure image, the proper exposure image, and the high exposure image.

Figure 10A:
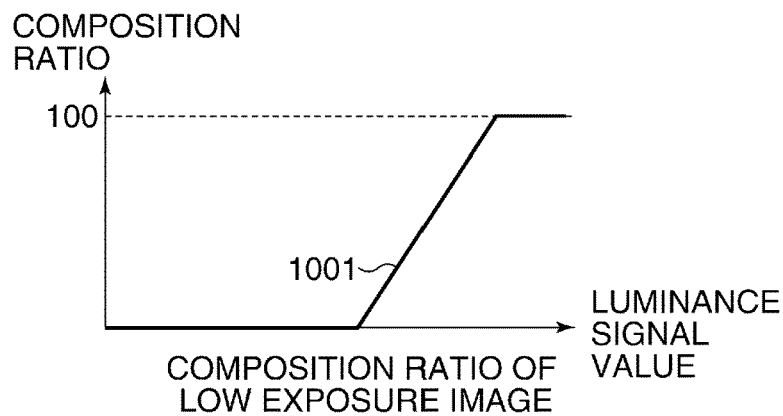
FIG. 10A, FIG. 10B, and FIG. 10C are views respectively showing examples of composition ratios of a low exposure image, a proper exposure image, and a high exposure image used in the composition-map generation process executed in the step S404 in FIG. 4.
Figure 10B:
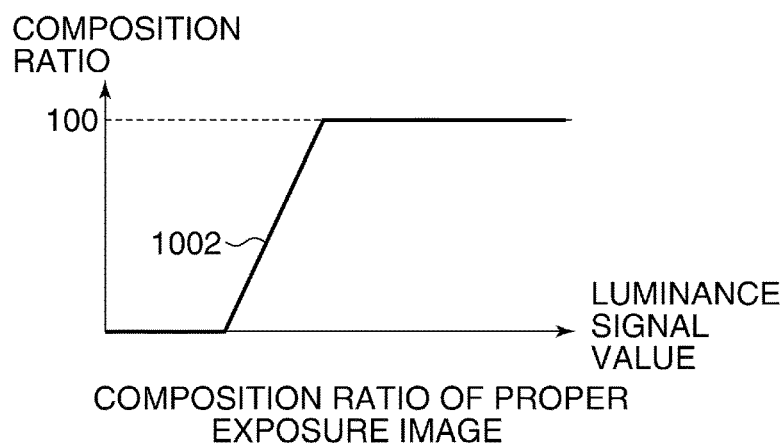
Figure 10C:
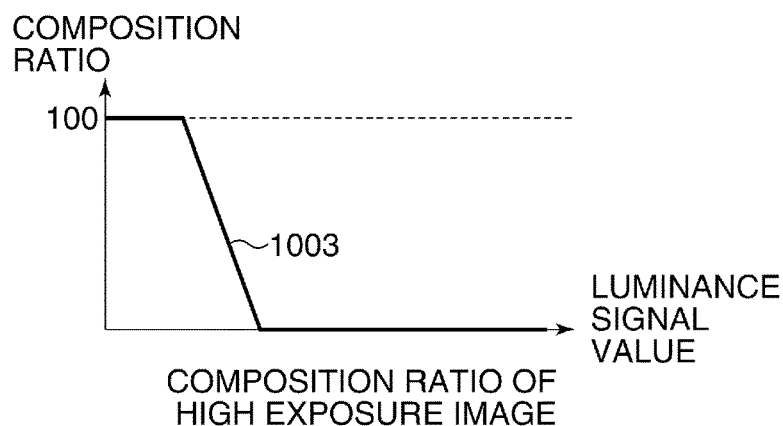

FIG. 10A, FIG. 10B, and FIG. 10C are graphs respectively showing the examples of the composition ratios of the low exposure image, the proper exposure image, and the high exposure image. Each of these graphs shows the relation between the signal value (luminance signal value) in a correction image used for a wide-angle image composition and a composition ratio.

For example, when compositing the low exposure image, the composition ratio of an image area to be composited is determined with reference to the composition ratio 1001 in FIG. 10A based on the signal value of the correction image corresponding to the low exposure image to be composited, and the composition map is generated. The composition ratio 1001 is low in the area (pixel) where a signal value is small, and is high in the area (pixel) where a signal value is large. This enables to reduce occurrence of black collapse in a wide-angle composite image.

In the same manner, when compositing the proper exposure image, the composition ratio of an image area to be composited is determined with reference to the composition ratio 1002 in FIG. 10B, and the composition map is generated. When compositing the high exposure image, the composition ratio of an image area to be composited is determined with reference to the composition ratio 1003 in FIG. 10C, and the composition map is generated. The composition ratio 1003 is high in the area (pixel) where a signal value is small, and is low in the area (pixel) where a signal value is large. This enables to reduce occurrence of halation in a wide-angle composite image. The composition ratio 1002 is almost set as the intermediate characteristics between the composition ratios 1001 and 1003.

It should be noted that composition ratios 1001 through 1003 are not limited to what are shown in FIG. 10A through FIG. 10C. For example, the composition ratio 1002 of the proper exposure image may be adjusted so that the composition ratio is set to "0" at the low luminance value side and at the high luminance value side, and is set to "100" in the middle. Moreover, the composition ratios of the low exposure image and high exposure image may be adjusted on the basis of luminance distribution in the proper exposure image. For example, when there are many areas where a luminance value is small in the proper exposure image, the gradient part of the composition ratio 1003 may be adjusted so as to be shifted to the high luminance value side while shifting the gradient part of the composition ratio 1001 to the high luminance value side.

Figure 9A:
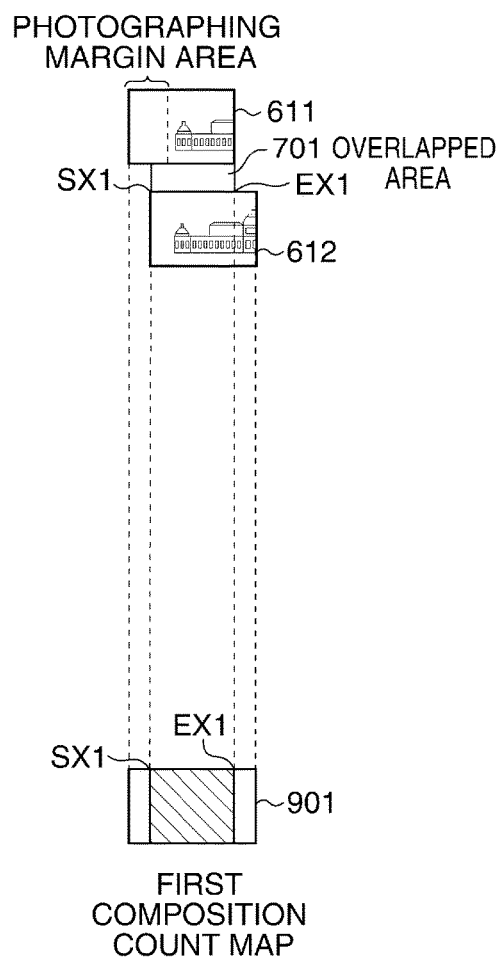
FIG. 9A through FIG. 9D are views schematically showing composition-count-map generation procedures executed in the step S801 in FIG. 8.
Figure 9B:
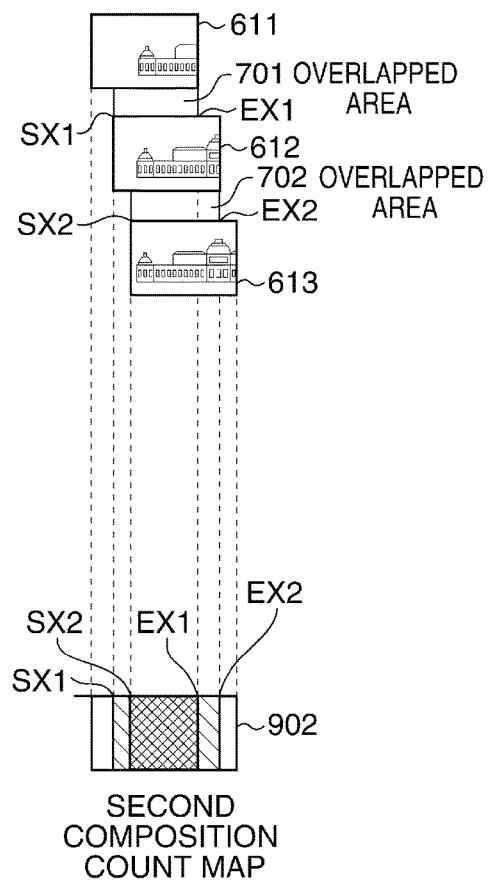
Figure 9C:
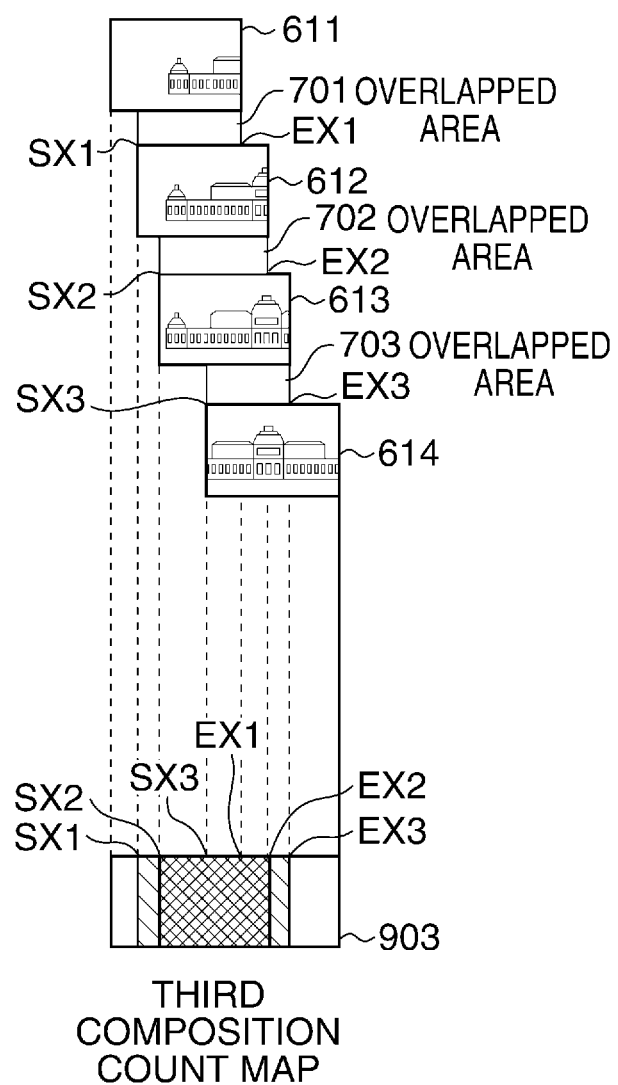
Figure 9D:
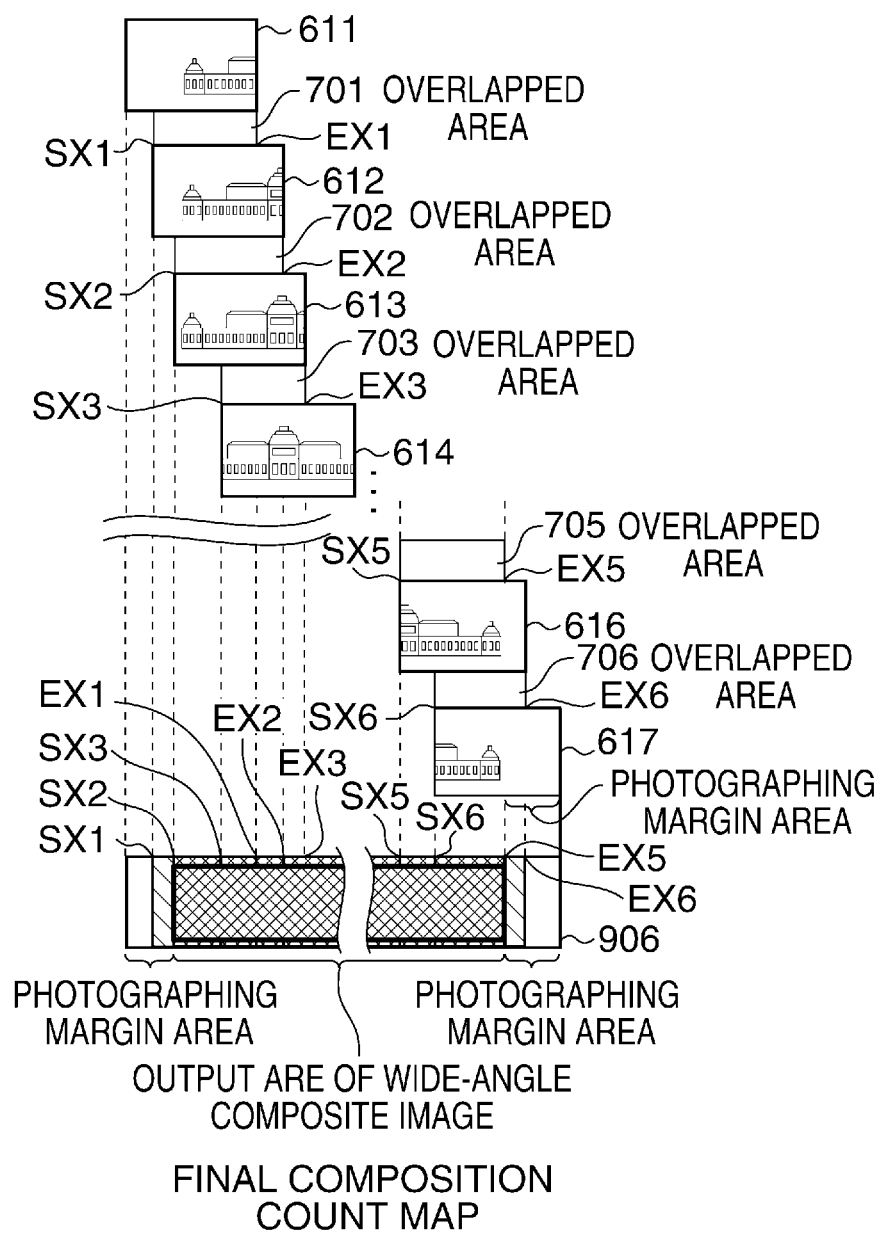

The final composition map is generated by adding the composition ratio to the sixth composition count map 906 shown in FIG. 9D. Since composition counts of overlapped areas may be less than the maximum composition count "2" in right-, left-, top-, and bottom-areas in the final composition map, these areas are treated as the photographing margin areas in this embodiment. As a result, the field angle of the final wide-angle composite image 620 will be shown by the areas from SX2 to EX5 shown in FIG. 9D.

In the wide-angle image composition by the wide-angle image composition unit 303 in step S405, the wide-angle composite image composited by the (N−1)th wide-angle image composition is composited with the (N+1)th photographed image that is used in the N-th wide-angle image composition on the basis of the N-th composition map, specifically. The N-th wide-angle composite image is computed according to the following composition formula using the (N−1)th wide-angle composite images, the photographed image used for the N-th wide-angle image composition, and the N-th composition map.

$$\text{Img}_{wide(N)}(x,y)=\text{Img}_{wide(N-1)}(x,y)\cdot(1-\text{MAP}_{mix\_number(N)}(x,y))+\text{Img}_{(N)}(x,y)\cdot\text{MAP}_{mix\_number(N)}(x,y) \quad \text{[Formula 1]}$$

$\text{Img}_{wide(N-1)}(x, y)$: (N−1)-th wide-angle composite image
$\text{Img}_{(N)}(x, y)$: Photographed image used for N-th wide-angle composite image
$\text{MAP}_{mix\_number(N)}(x, y)$: N-th composition map It should be noted that (x, y) shows the position on the image coordinate. Moreover, since the photographed images (correction images) obtained by the panning photographing are composited, a certain area exists in only one image. The process is performed so that the certain area is output from the image in which the certain area exists.

As mentioned above, this embodiment enables to generate the wide-angle composite image that improves in reduction of halation and black collapse and expands the dynamic range by compositing images photographed with different exposure values including a proper exposure value. Moreover, since a wide-angle composite image is generated by compositing overlapped areas in photographed images in order, the memory quantity required for the image composition is reduced in comparison with the conventional method that composites images of different exposure values beforehand and then composites the composite images.

Next, a second embodiment of the present invention will be described. In the second embodiment, the maximum composition count used for generating the composition count map is set to "3" or more. Since the second embodiment increases the number of changes of exposure values as compared with the first embodiment to expand the dynamic range, the composite image that reduces halation and black collapse more efficiently is obtained. The maximum composition count is determined according to the composition count (the number of the images to composite) in a predetermined area of an image.

For example, when the maximum composition count is Nlim, the start coordinate of the overlapped area between the adjacent images in the N-th composition count map is SX(N), and the end coordinate of the overlapped area is EX(N), the area of which the composition count reaches the maximum composition count appears first at the time of the Nlim-th composition. Accordingly, when a composition map is generated up to the Na-th map (1≤Na≤Nlim), the composition map is updated in the overlapped area from SX(Na) to EX(Na) between the adjacent images. Then, when a composition count map is generated from the Nb-th map (Nb>Nlim), it is changed so that the composition count map is updated in the overlapped area from EX(Nb−Nlim) to EX(Nb) between the adjacent images.

For example, when the maximum composition count is set to "3", the area of which the composition count reaches the maximum composition count appears first at the time of generating the third composition map. Accordingly, when a composition map is generated up to the third map (1≤Na≤3), the composition map is updated in order in the area from SX(Na) to EX(Na). When a composition map is generated from the fourth map (Nb>3), the composition map is updated in order in the area from EX(Nb−3) to EX(Nb). Thus, even if the upper limit of the composition count (the maximum composition count) that is the number of composition of the same area is changed, the image process concerning the present invention is executable.

Next, a third embodiment of the present invention will be described.

Peripheral areas of a photographed image apart from its center may have distortions owing to aberration of a lens constituting the optical system 104. Moreover, the distortions vary as the focal length is changed. Accordingly, even if the alignment process is performed to adjacent images obtained by the panning photographing, the adjacent images may not be properly aligned owing to the distortions. Accordingly, in the third embodiment, the overlapped area that is computed from the feature quantity found by the alignment process is further narrowed according to the amount of the distortion in the photographed image. On the contrary, when a process for improving the composition accuracy of a wide-angle composite image, such as a distortion correction and cylinder conversion, is performed, it is also possible to set the overlapped area computed from the feature quantity found by the alignment process as the maximum usable area.

Next, a fourth embodiment of the present invention will be described. In the fourth embodiment, the photographing margin areas that are set in the photographed images at the start and end of the panning photographing and are not used in the finally generated wide-angle composite image are changed according to the maximum composition count in the composition map. When the maximum composition count increases, the number of photographed images that are composited until reaching the maximum composition count increases, which narrows the field angle used for the wide-angle image composition. Accordingly, in the fourth embodiment, the photographing margin areas are set widely when the maximum composition count is large.

Next, a fifth embodiment of the present invention will be described. In the fifth embodiment, the panning position and angle of the digital camera 100 are specified using the detection result of the detection unit 110, and the overlapped area between photographed images is determined. That is, the overlapped area between adjacent photographed images is determined by computing the angular coordinate and positional coordinate of the digital camera 100 computed on the basis of the detection signal of the detection unit 110 as relative values from reference values. This method enables to specify a correct overlapped area rather than the method for finding an overlapped area by image analysis like a motion vector method, when an object that is low in contrast or includes repeated patterns is photographed. It should be noted that the process for specifying an overlapped area between photographed images by image analysis like in the first embodiment and the process for determining an overlapped area between photographed images on the basis of the detection signal of the detection unit 110 like in the fifth embodiment may be together used. For example, an overlapped area between photographed images that is specified by the image analysis may be corrected using the detection signal of the detection unit 110.

Next, a sixth embodiment of the present invention will be described. In the sixth embodiment, the maximum composition count of a composition map is changed according to panning speed of photographing. For example, the maximum composition count is controlled so that the maximum composition count of a composition map decreases as the panning speed increases. The reason is because the number of photographed images constituting a desired wide-angle composite image decreases as the panning speed increases.

For example, the case where a wide-angle composite image is generated by compositing five images photographed with five different exposure values around a proper exposure value is considered. In this case, when the field angle of one photographed image is 90 degrees, for example, it is necessary to photograph images at angular intervals smaller than 22.5 degrees in order to secure an overlapped area among the five photographed images. Accordingly, when images are photographed at angular intervals larger than 22.5 degrees, the maximum composition count is decreased. For example, when the field angle of one photographed image is 90 degrees and images are photographed at angular intervals of 30 degrees, the maximum composition count is set to "2" (3 images), because there is no overlapped area between a first image and a fourth image.

Moreover, it may be determined whether an overlapped area exists between adjacent photographed images using the detection signal from the detection unit 110. When there is no overlapped area because of the fast panning speed, a warning may be emitted or the wide-angle image composition process may be stopped.

Next, a seventh embodiment of the present invention will be described. In the first embodiment, the maximum composition count when generating the composition map is set to "2", and the wide-angle composite image is generated by only the composite areas of which the composition count reaches "2". However, the present invention is not limited to this. In order to extend the field angle, an area in an image of which composition count does not reach the maximum composition count (an area of which composition count is "0" or "1") may be also added to a wide-angle composite image.

In this case, it is preferable to adjust the composition ratio of the area (area to be added) in the image of which the composition count does not reach the maximum composition count according to the signal value (luminance value) of the image. Moreover, it is preferable to determine whether halation or black collapse is included in an area of the image to be added, and to perform composition so that an area that is not included in the wide-angle composite image is added to the wide-angle composite image when halation or a black collapse is not included. It should be noted that the image photographed with the proper exposure is used when the area of the image (for example, the image photographed at the end) of which the composition count is zero is used.

Although the embodiments of the invention have been described, the present invention is not limited to the above-mentioned embodiments, the present invention includes various modifications as long as the concept of the invention is not deviated. The embodiments mentioned above show examples of the present invention, and it is possible to combine the embodiments suitably.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-163613, filed Aug. 11, 2014, which is hereby incorporated by reference herein in its entirety.

What is claimed is:

1. An image processing apparatus comprising:
at least one memory configured to store instructions; and
at least one processor connected to the at least one memory and configured to execute the instructions to:
obtain a plurality of images that are generated by repeating to photograph images with exposure values different for every predetermined step while changing a photographing target area continuously;
detect an overlapped area among the plurality of images;
compute composition ratios of the overlapped areas of the plurality of images according to signal value of at least one of the plurality of images and the exposure values of the plurality images; and
generate a wide angle-composite image by compositing the plurality of images based on the composition ratios,
wherein the at least one processor executes further instruction to:
when compositing another image onto the generated wide-angle composite image to generate a new wide-angle composite image,
not use the another in an area where a predetermined number of images are used for compositing the plurality of images, from among the overlapped areas where the another image and the generated wide-angle composite image overlap each other,
but use the another image in an area where images of which number is less than the predetermined number are used for compositing the plurality of images, from among the overlapped areas.

2. The image processing apparatus according to claim 1, wherein the plurality of exposure values include a low exposure value and a high exposure value with respect to a proper exposure value, respectively,
wherein the composition ratio of an image photographed with the low exposure value is computed so as to be low in an area where the signal value is small and to be high in an area where the signal value is large, and wherein the composition ratio of an image photographed with the high exposure value is computed so as to be high in an area where the signal value is small and to be low in an area where the signal value is large.

3. The image processing apparatus according to claim 2, wherein the composition ratios of the images photographed with the high and low exposures values is adjusted based on luminance distribution in the image photographed with the proper exposure value.

4. The image processing apparatus according to claim 1, wherein the predetermined number is set according to the number of the different exposure values different for every predetermined step.

5. The image processing apparatus according to claim 4, wherein in the overlapped areas of the images photographed with the plurality exposure values different every predetermined step, the plurality of images, each of which is photographed with its exposure value, are composited one by one.

6. The image processing apparatus according to claim 1, wherein the last image among the plurality of images is added to the wide-angle composite image, when the last image is photographed with the proper exposure.

7. The image processing apparatus according to claim 1, wherein the overlapped area is corrected based on a focal length and an aberration amount of a lens of an image pickup unit that took the plurality of images.

8. The image processing apparatus according to claim 1, wherein the predetermined number is changed according to a speed of changing a photographing target area when the plurality of images are photographed.

9. An image processing method comprising:
obtaining a plurality of images that are generated by repeating to photograph images with exposure values different for every predetermined step while changing a photographing target area continuously;
detecting an overlapped area among the plurality of images;
computing composition ratios of the overlapped areas of the plurality of images according to signal value of at least one of the plurality of images and the exposure values of the plurality of images; and
generating a wide angle composite image by compositing the plurality of images based on the composition ratios;
generating a new wide-angle composite image when compositing another image onto the generated wide-angle composite image;
not using the another image in an area where a predetermined number of images are used for compositing the plurality of images, from among the overlapped areas where the another image and the generated wide-angle composite image overlap each other,
but using the another image in area where images of which number is less than the predetermined number are used for compositing the plurality of images, from among the overlapped areas.

10. A non-transitory computer-readable storage medium storing an image processing program causing a computer o execute an image processing method, the image processing method comprising:
obtaining a plurality of images that are generated by repeating to photograph images with exposure different for very predetermined step while changing a photographing target area continuously;
detecting an overlapped area among the plurality of images;
computing composition ratios of the overlapped areas of the plurality of images according to signal value of at least one of the plurality of images and the exposure values of the plurality of images; and
generating a wide-angle composite image by compositing the plurality of images based on the composition ratios;
generating a new wide-angle composite image when compositing another image onto the generated wide-angle composite image;
not using the another image in an area where a predetermined number of images are used for compositing the plurality of images, from among the overlapped areas where the another image and the generated wide-angle composite image overlap each other,
but using the another image in an area where images of which number is less than the predetermined number are used for compositing the plurality of images, from among the overlapped areas.

11. An image pickup apparatus comprising:
an image sensor configured to repeat to photograph images with a plurality of different exposure values while performing panning photograph;
at least one memory configured to store instructions; and
at least one processor connected to the at least one memory and configured to execute the instructions to:
obtain a plurality of images that are generated by repeating to photograph images with exposure values different for every predetermined step while changing a photographing target area continuously;
detect an overlapped area among the plurality of images;
compute composition ratios of the overlapped areas of the plurality of images according to signal value of at least one of the plurality of images and the exposure values plurality of images; and
generate a wide-angle composite image by compositing the plurality of images based on the composition ratios,
wherein the at least one processor executes further instruction to:
when compositing another image onto the generated wide-angle composite angle image to generate a new wide-angle composite image,
not use the another image an area where a predetermined number of images are used for compositing the plurality of images, from among the overlapped areas where the another image and the generated wide-angle composite image overlap each other,
but use the another image in an area where images of which number is less than the predetermined number are used for compositing the plurality of images, from among the overlapped areas.

12. The image pickup apparatus according to claim 11, wherein the last image among the plurality of images is added to the wide-angle composite image, when the last image is photographed with the proper exposure.

13. The image pickup apparatus according to claim 11, further comprising a motion detecting unit comprising a gyro sensor and/or an acceleration sensor configured to detect a motion of the image pickup apparatus,
where the predetermined number is changed according to a speed of the motion of the image pickup apparatus.

* * * * *